Sept. 26, 1950 B. B. BOYCE ET AL 2,523,808
BODY FOR STREET-CLEANING MACHINES
Original Filed Jan. 16, 1946 5 Sheets-Sheet 1

Inventors
BOYKIN B. BOYCE
WILLIAM B. POWELL
By Weatherford
Weatherford
Attys

Sept. 26, 1950     B. B. BOYCE ET AL     2,523,808
BODY FOR STREET-CLEANING MACHINES
Original Filed Jan. 16, 1946     5 Sheets-Sheet 4
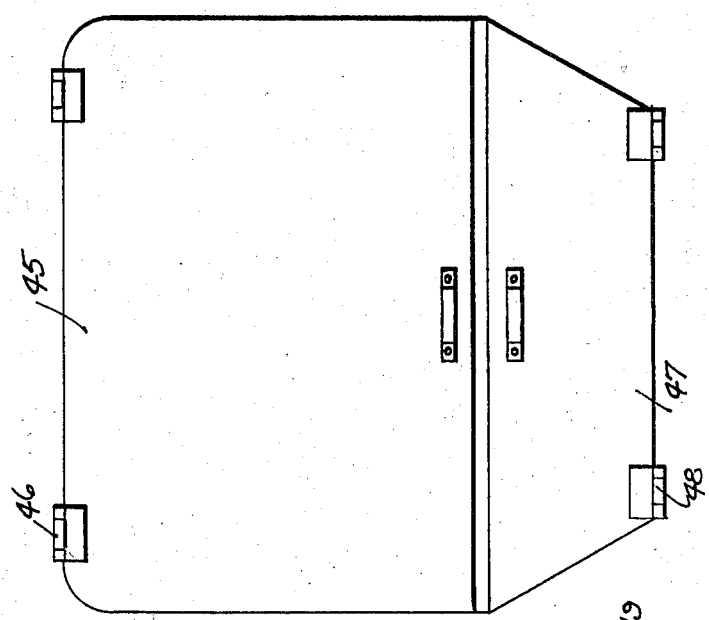
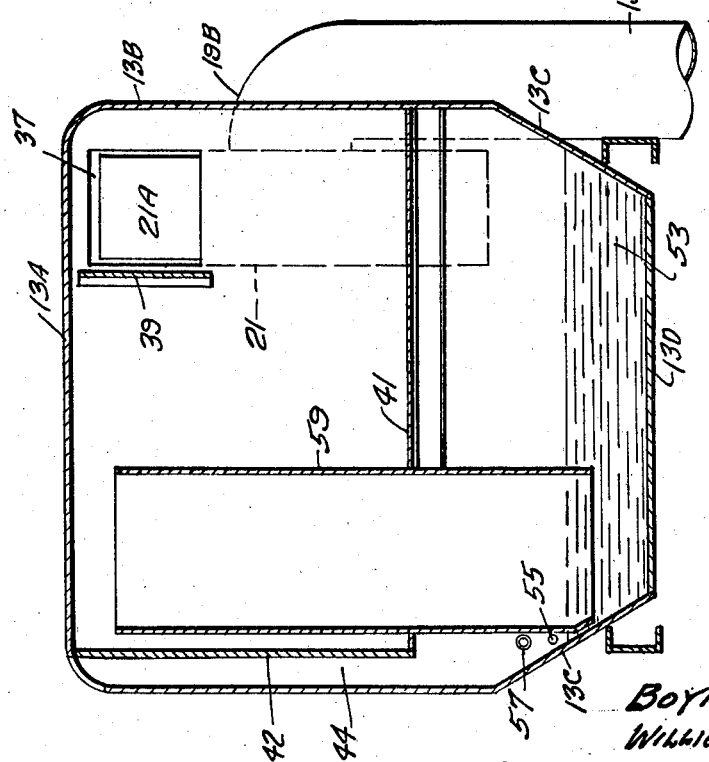
Inventor
BOYKIN B. BOYCE
WILLIAM B. POWELL
By Weatherford and Weatherford Attys.

Sept. 26, 1950 B. B. BOYCE ET AL 2,523,808
BODY FOR STREET-CLEANING MACHINES
Original Filed Jan. 16, 1946 5 Sheets-Sheet 5
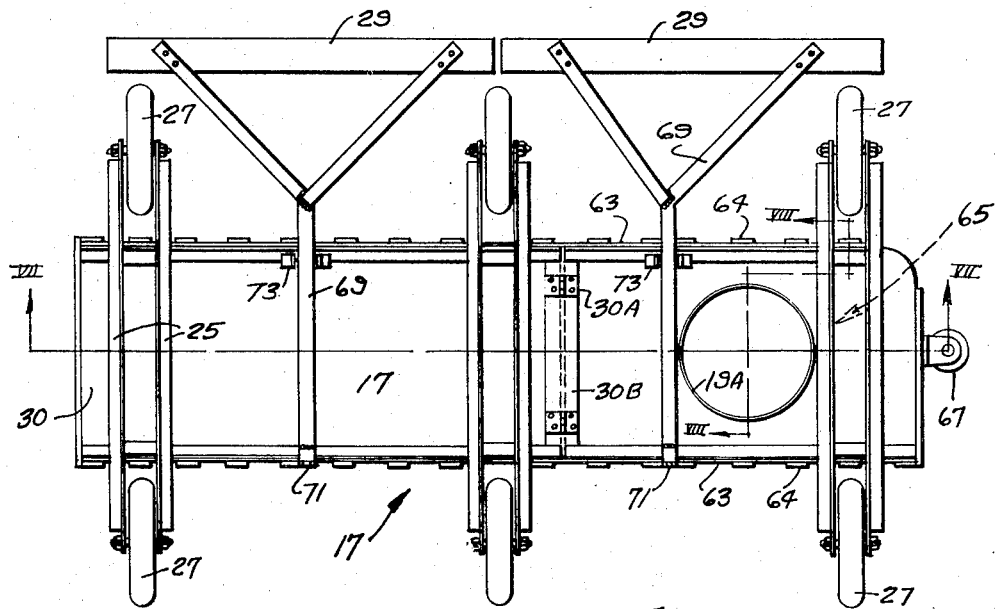
Fig. 6.
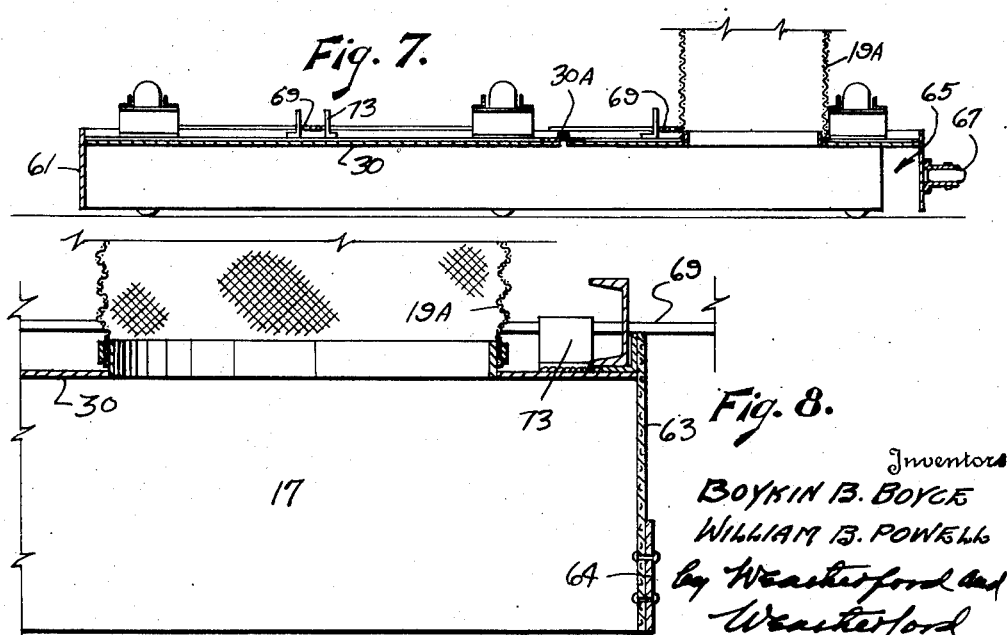
Fig. 7.
Fig. 8.
Inventors
BOYKIN B. BOYCE
WILLIAM B. POWELL
by Weatherford and Weatherford
Attys.

Patented Sept. 26, 1950

2,523,808

UNITED STATES PATENT OFFICE 2,523,808

BODY FOR STREET-CLEANING MACHINES

Boykin B. Boyce and William B. Powell, Memphis, Tenn.

Original application January 16, 1946, Serial No. 683,861. Divided and this application September 25, 1947, Serial No. 775,980

3 Claims. (Cl. 183—28)

This invention relates to street cleaning machines which sweep the street, pick up the trash and accompanying dirt and dust and load them into a body for disposal. It particularly relates to the body into which the materials picked up are loaded, and is a division of our copending application for suction street sweepers; Serial No. 683,861; filed July 16, 1946.

Sweeper truck bodies as known tend to fill up first adjacent the trash receiving end and are difficult to fully load and dust suppression, if attempted, is inefficient.

The objects of the present invention are:

To provide a truck body and pickup mechanism in which loading of the body progresses from the end of the body remote from the pickup delivery;

To provide a truck body in which dust delivered from a pickup mechanism is suppressed and collected;

To provide a truck body from which trash and dust collected may be readily and separately removed; and To provide a simple and efficient truck body for the reception of trash and dust from street cleaning mechanisms;

To provide a simple and efficient sweeper unit for a street cleaning machine.

The means by which the foregoing and other objects are accomplished and the manner of their accomplishment will readily be understood from the following specification upon reference to the accompanying drawings, in which:

Fig. 2A is an enlarged fragmentary elevational detail showing one corner of the doors shown in Fig. 2.

Fig. 4 is a transverse sectional elevation taken on the line IV—IV of Fig. 3.

Fig. 5 is an elevation of the rear end of the body.

Fig. 6 is a plan view of the sweeper mechanism.

Fig. 7 is a sectional elevation on the line VII—VII of Fig. 6; and

Figure 1:
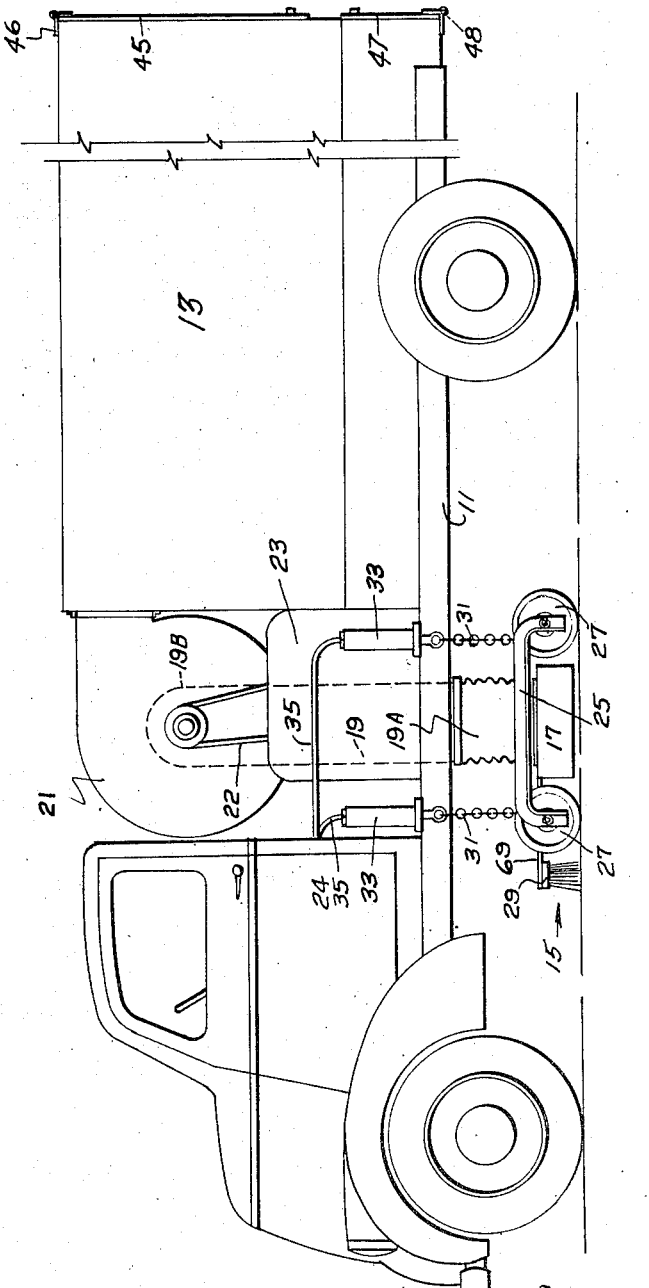
Fig. 1 is a side elevation of a platform truck with sweeper and pickup mechanisms mounted thereon.

Fig. 8 an enlarged fragmentary sectional elevation on the line VIII—VIII of Fig. 6.

Referring now to the drawings in which the various parts are indicated by numerals:

The numeral 11 designates the platform of a motor truck on which a body 13, adapted for the reception of trash and dust, is mounted. Underlying the truck platform is the sweeper unit 15 which includes a transversely mounted collector box 17, from which a suction pipe 19 extends upward to a conventional suction fan 21, which delivers the trash and dust into the body 13. The fan 21 may be driven through a belt 22 by an engine which is mounted on the truck platform and enclosed in a housing 23.

The sweeper unit 15 includes frames 25 in which wheels 27 are journalled. Forwardly of the wheels 27 are brushes 29 and between the wheels and beneath the frames 25 is the collector box 17. The suction pipe 19 is connected with the top plate 30 of the collector box 17 through a flexible or telescoping section 19A to permit raising of the sweeper unit, including the collector box, relatively to the platform 11 of the motor truck, this raising preferably being accomplished as through links 31 by hydraulic cylinder-piston assemblies 33 coupled through pipes 35 to suitable pumping mechanism, such as is now a usual part of truck power plants.

The suction pipe 19 connects, in usual manner, through an elbow 19B into the center of the fan 21, the fan having blades 21A which extend from a hub 21B. The fan discharges rearwardly through an opening 37 in the truck body and horizontally along the underside of the top 13A, adjacent the right hand side wall 13B of the body. Preferably a short baffle plate 39 extends rearwardly from the opposite side of the opening 37.

The body is preferably of generally rectangular cross section with a flat, substantially horizontally disposed top 13A, vertical side walls 13B, which preferably have inwardly inclined lower portions 13C, a horizontally disposed flat bottom 13D and a forward vertical end wall 13E, this end wall, the roof, sides and bottom of the truck being integrally connected as by welding.

Intermediate its depth, and some one-third the height of the body above the bottom 13D, is a trash floor 41 which is integrally secured to one of the side walls 13B and extends horizontally therefrom to an auxiliary wall 42, and is integrally secured to the lower edge of that wall. The trash floor preferably slopes slightly downward toward the rear of the body and is supported by transverse members 43, 43A, preferably channel irons, which extend from side wall to side wall. The auxiliary wall 42 is preferably substantially co-extensive in length with and is spaced a matter of a few inches from the other of the side walls and extends to and is integrated to the top 13A of the body, establishing a passageway 44 open at the top for the escape of air along the length of the body.

Figure 2:
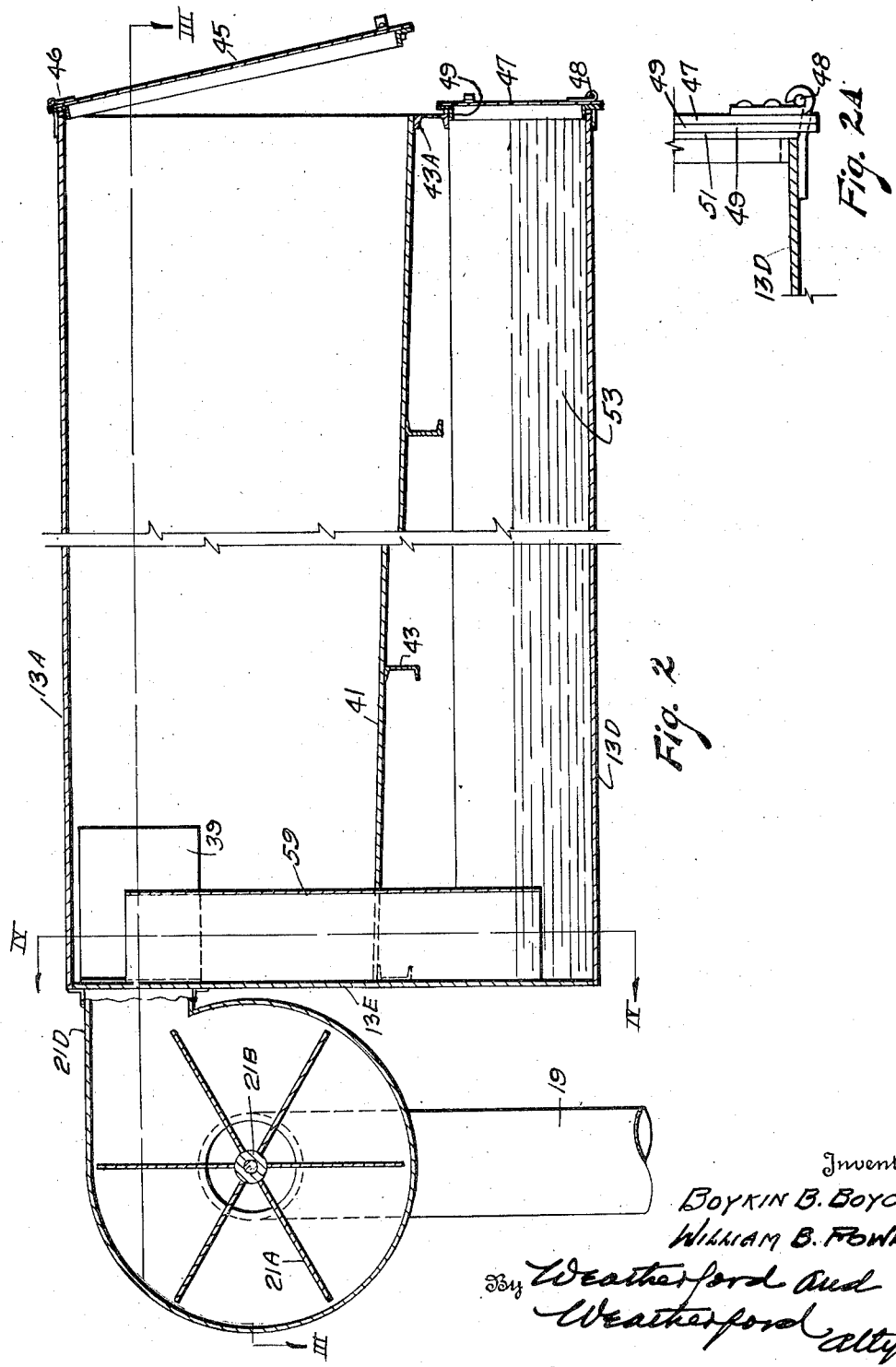
Fig. 2 is a sectional elevation of the body and pickup mechanisms taken on the line II—II of Fig. 3.
Figure 3:
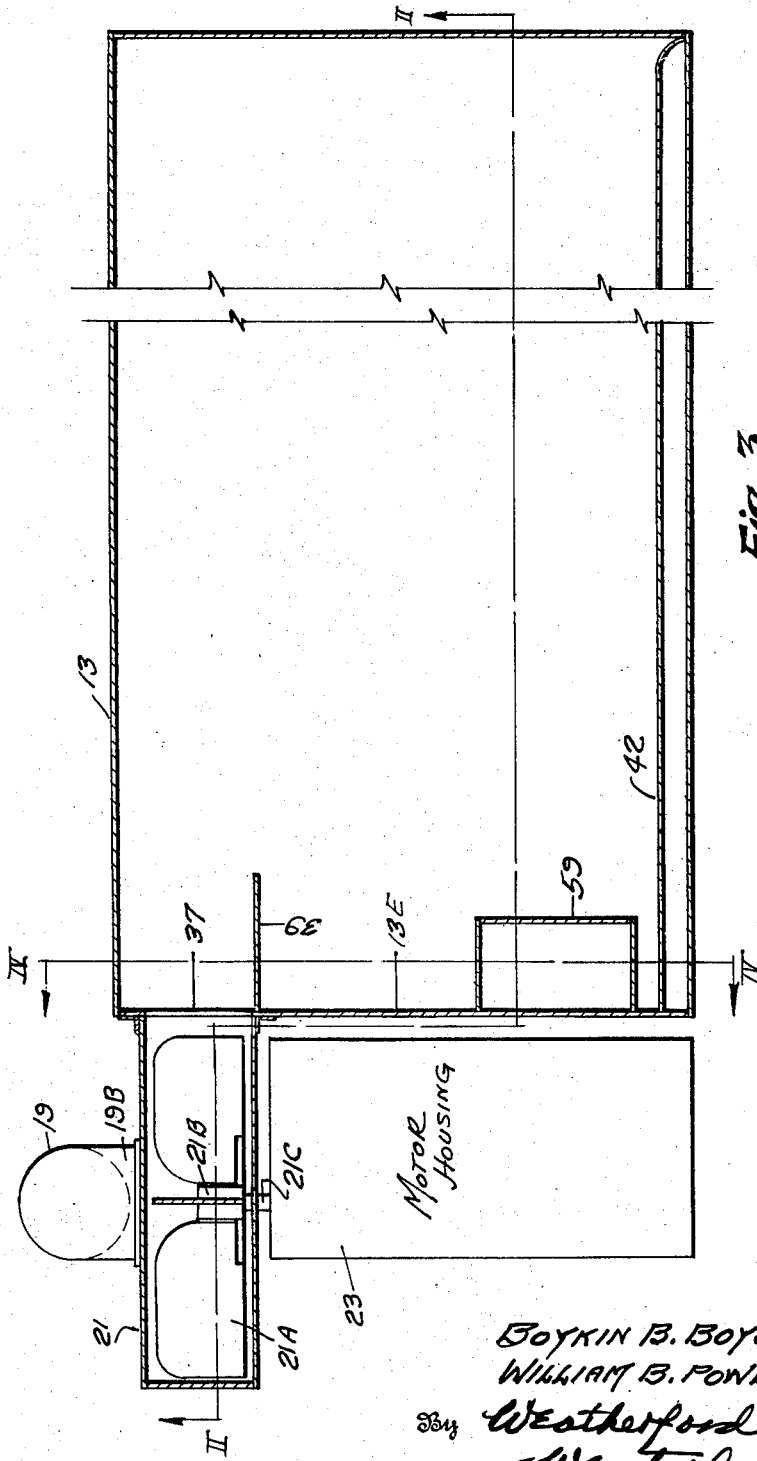
Fig. 3 is a corresponding sectional plan taken on the line III—III of Fig. 2.

The back end of the body is formed by a door 45 hinged to the top 13A by hinges 46 and a door 47 hinged to the bottom 13D of the body by hinges 48, which doors respectively provide access from the rear end of the body for removal of trash and of mud from the body. The edges of the doors may have angle iron frames 49 which have leg portions snugly telescoping into the back end of the body and forming a tight closure therewith, the bottom angle of the upper door 45 contacting the top of the trash floor 41 and the top angle of the lower door 47, the under side of the cross member 43A at the rear of the body. The doors seal their respective sections, and if desired, they may be provided with gaskets 51 (Fig. 2A) to assist in effecting such seals.

That portion of the body below the trash floor when closed by the door 47 forms a chamber 53 for water, the level of the water in the chamber being controlled by a removable plug 55 and filling accomplished through a filler pipe 57.

At the front end of the body on the opposite side from the fan opening 37 is a vertically disposed air pipe 59, open top and bottom, which at its upper end is spaced slightly below the top of the body and at its lower end extends into the water in the chamber 53.

The collector box 17 of the sweeper unit preferably is carried by three, wheel-mounted frames, the top plate 30 of the box being in two sections connected by hinges 30A with the joint between the sections sealed by a canvas strip 30B underlying the hinges. At the opposite ends of the plate sections are vertically disposed end plates 61, the right hand end plate 61 extending forwardly from the rear edge of the top plate and terminating short of its front edge. Along the front and back edges of the top plate, curtains 63, as of canvas, depend into similar proximity to the street surface, the front curtain from left to right terminating short of the right hand end of the top plate, leaving an entrance 65 for trash at the front right hand corner of the collection box. The lower edges of the curtains are preferably weighted and stiffened from time to time by plates 64. 66 is a guide wheel adapted to roll along the curb and hold the right hand end of the box from contact with the curb.

The brushes 29 are carried by arms 69 which overlie the top of the box and are connected thereto by hinges 71, preferably at the back edge of the box, allowing upward movement of the brushes independently of the box. 73 are guides at the front of the arms and brushes carried thereby.

In use, the sweeper is driven along the street, usually the right curb in accordance with other traffic. The brushes 29 sweep the bulkier trash forward and with the help of the street crown, toward the gutter where it enters through the open corner of the collection box. The brushes also scratch and loosen fine trash and dust adhering to the street surface, this material passing under the brushes and front curtain into the box. The fan suction picks up the trash and dust from the box and discharges it rearwardly into and along the top of and toward the back end of the body, at least the major part of the trash being carried to the back end or against the trash previously there deposited, the adjacency of the open top end of the air pipe 59 to the top assuring that complete filling of the body may be accomplished. At street inlets and other points where excess of trash has accumulated against the inlet grating or curb, progress of the sweeper along the street may be temporarily halted until the accumulation is picked up.

Air entrained dust, not deposited with the trash, passes downward through the pipe 59 and into the water in the chamber 53 where the air bubbles up leaving the dust as mud. Air, after depositing its dust content in the water, escapes through the passageway 44.

When the body is filled the sweeper unit is raised and driven to the dump, where the door 45 is opened and the trash removed. Usually after several loads of trash have been dumped the door 47 must also be opened and the mud dumped, the water chamber 53 is refilled, and the machine is ready for further use.

It will be understood that much of the detail herein included as illustrative only and it is to be distinctly understood that no claim shall be limited to the detail shown unless such detail is specifically set out in the claims.

We claim:

1. A body for a pickup street sweeper, said body being of substantially rectangular cross section, and comprising a front end, side, bottom, and top walls; an auxiliary wall, extending rearwardly from said front end, depending less than the depth of said body from said top wall in adjacency to one of said side walls, but spaced therefrom to form with said side wall an air escape passageway; said top wall being apertured above said passageway for said air escape; a trash floor extending from said auxiliary wall to the opposite said side wall and separating said body into an upper trash compartment and a lower water chamber, said floor and walls being unobstructed rearwardly from said end, to promote unobstructed emptying and cleaning of said compartment and chamber; and doors, substantially coextensive with and respectively effecting closures for the rear ends of said compartment and said chamber; said front end having an opening therethrough adjacent the top of said body, and laterally opposite said opening, these being along said end, an upright air escape pipe open top and bottom, said pipe extending from adjacency with the top of said trash compartment downward below the water level of said chamber; and a fan discharging and directing air and entrained materials through said opening against the top of the rear end of said compartment, whereby discharge of said materials through said end will promote progressive filling of said compartment from end to end, said fan discharge being of less area than said air escape pipe and passageway.

2. In a pickup street sweeper, an elongated, horizontally disposed body of substantially rectangular cross section, a trash floor intermediate the height of said body separating said body into an upper trash compartment and a lower water chamber, and doors effecting respective closures for the rear ends of said trash compartment and said water chamber; said body having an opening into its forward end adjacent the top of said body, a fan discharging and directing flow of air and entrained materials through said opening tangentially along the top of said compartment to the rear end thereof, an air pipe for said trash compartment disposed at the forward end of said body, and extending from adjacency with the top of said trash compartment downward below the water level of said chamber, and an air vent for said water chamber extending upward therefrom, said floor, and the walls and bottom of said compartment and chamber being unobstructed throughout their length, and said doors, being of equal width with their respective said compartment and chamber and respectively extending to the bottoms thereof.

3. A body for a pickup street sweeper, said body being of uniform cross section, throughout its length and intermediate its depth including a floor coextensive in length with and dividing it into an upper trash compartment and a lower water chamber, said compartment and chamber being respectively provided at their rear ends with doors effecting closure of said compartment and said chamber, said doors being respectively coextensive in width with said compartment and chamber and extending to the bottom of each thereof, and said compartment and chamber each being unobstructed from end to end to promote removal of materials therefrom and cleaning; the front end of said compartment having an opening therethrough adjacent its top; means discharging and directing air and entrained materials through said opening tangentially along the top of said compartment to the rear end thereof whereby discharge of said materials against the rear end of said body and progressive filling of said body from rear to front is promoted; an air escape pipe, open top and bottom, disposed within and against the forward end of said compartment and extending from adjacency with the top of said compartment downward into said chamber and below the water level thereof, and means opening through and extending upward from said floor venting said water chamber, said escape pipe and said venting means being of greater area than said discharge means.

BOYKIN B. BOYCE.
WILLIAM B. POWELL.

REFERENCES CITED

The following references are of record in the file of this patent:

UNITED STATES PATENTS

| Number | Name | Date |
|---|---|---|
| 328,057 | Paine | Oct. 13, 1885 |
| 1,253,939 | Clarke | Jan. 15, 1918 |
| 1,527,010 | Powell | Feb. 17, 1925 |